INVENTOR
Adrian P. Brokaw
BY Robert K. Schumacher
ATTORNEY

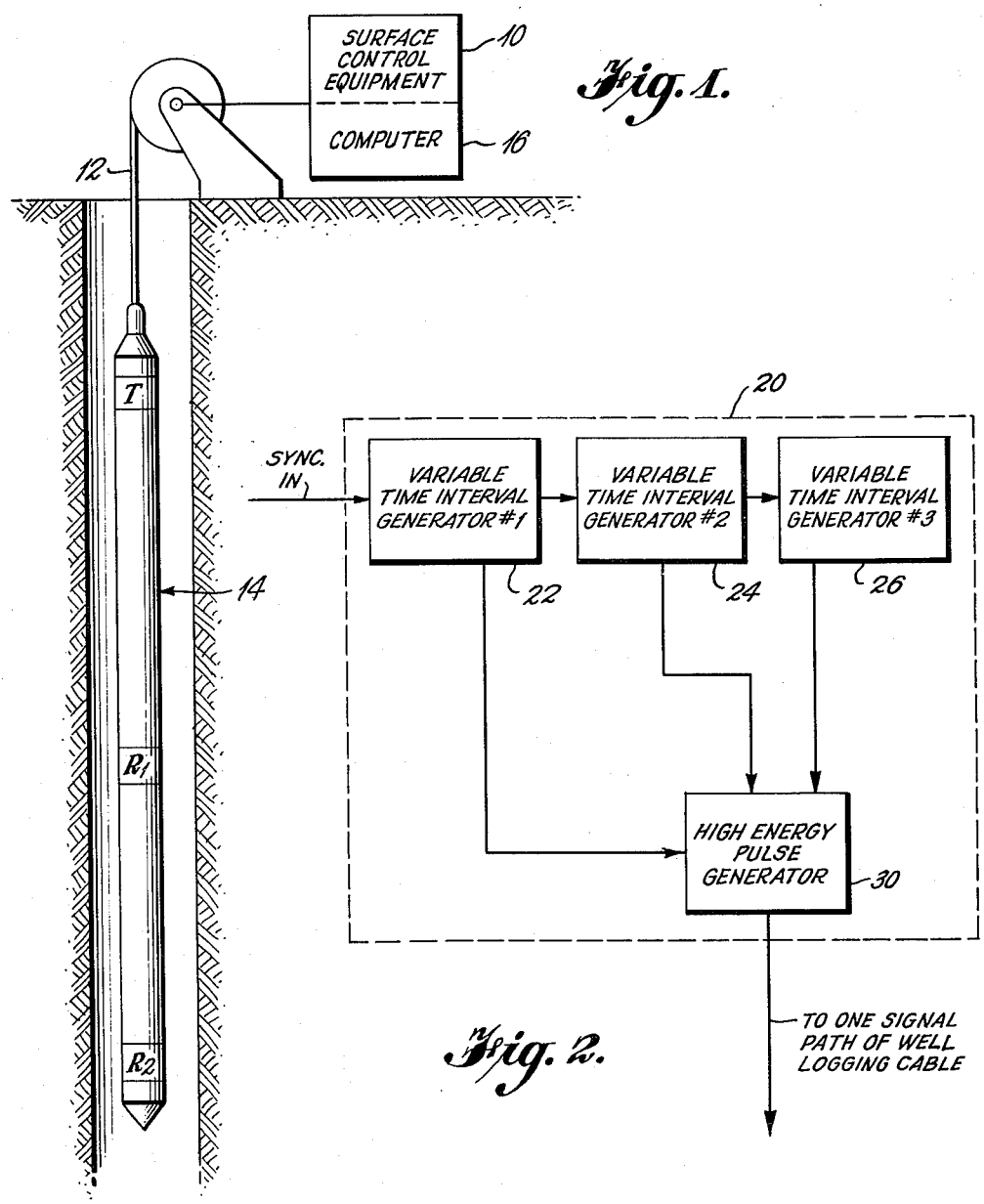

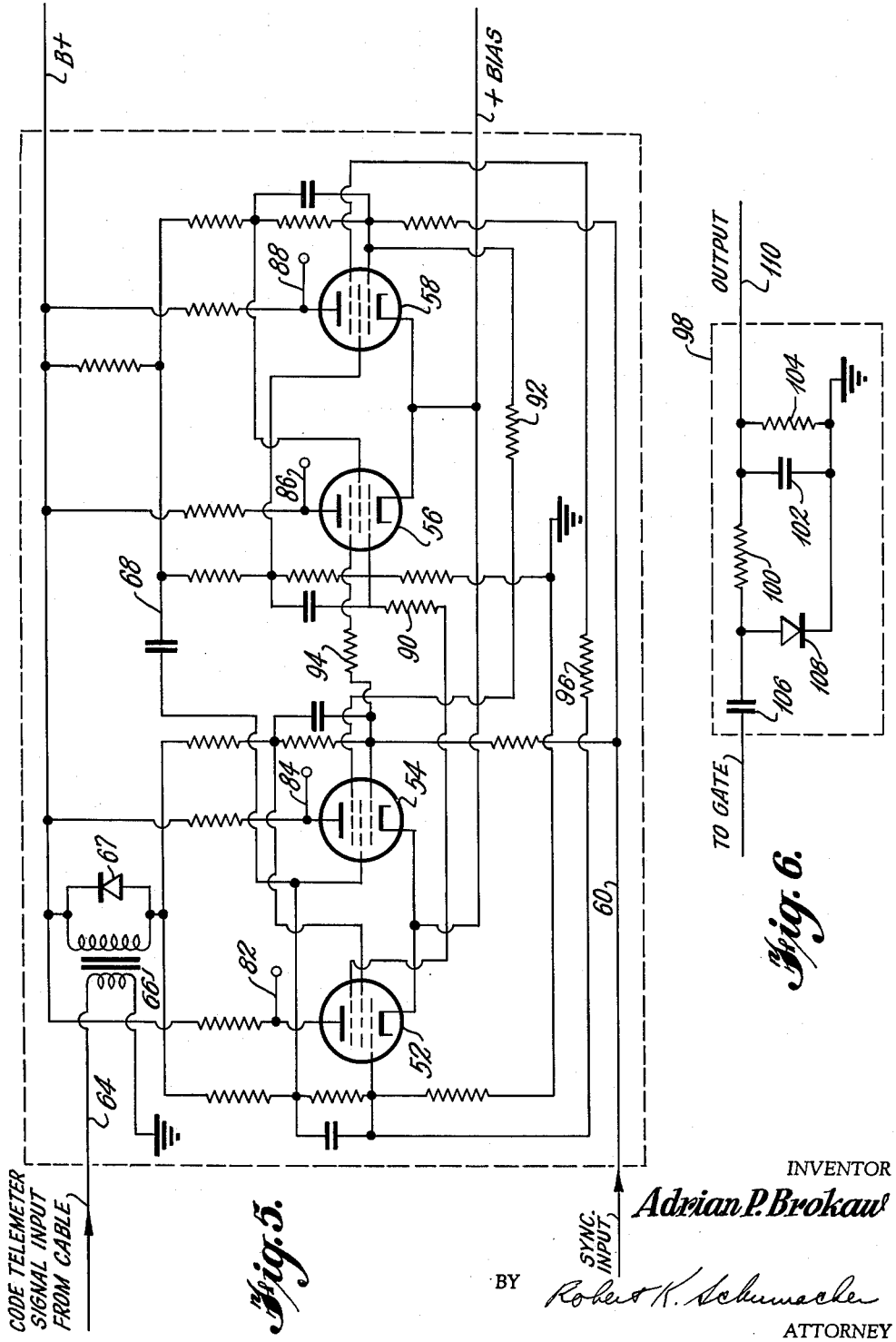

United States Patent Office 3,195,105
Patented July 13, 1965

3,195,105
REMOTE CONTROL SYSTEM FOR WELL
LOGGING INSTRUMENTS
Adrian P. Brokaw, Stillwater, Okla., assignor, by mesne
assignments, to Dresser Industries, Inc., Dallas, Tex.,
a corporation of Delaware
Filed Mar. 17, 1960, Ser. No. 15,720
2 Claims. (Cl. 340—18)

The present invention relates to a remote control system for electronic tools or instruments in general, and has particular reference to an improved remote control system for controlling a plurality of, for example, amplifiers as used for well logging instruments that are in a subsurface environment. The present invention is directed to a remote control system to enable an operator of oil well logging equipment to control several operating parameters in a subsurface tool, even though the cable connecting the tool to the surface recording equipment may be long and have only a limited number of conductors.

The invention also seeks to provide a remote control system to enable these adjustments or controls to be made in a "smooth" fashion without relying on large fixed steps of change.

In the new remote control system, the invention provides for minimizing the number of signal paths necessary to control the several variables or parameters in subsurface tools.

Therefore, it is an object of the invention to provide a device using pulse time modulation to control the operating parameters in a well logging tool. Also it is an object of the invention to provide for the operation of a vacuum tube, or similar control device, in a remotely positioned tool to serve simultaneously as a switch in a control circuit and as a coincidence gate controlled by the control circuit and using the same grouping of control elements within the vacuum tube to perform these functions.

Furthermore, it is an object of the present invention to use a vacuum tube in a control circuit, serving the function of a coincidence gate as well as a switch tube so that a minimum of components are necessary to perform a desired function.

The above and other objects and advantages of the invention will become apparent upon full consideration of the following detailed description and accompanying drawings in which:

FIGURE 1 is a diagrammatic view of an acoustic well logging tool in a well borehole in accordance with the invention;

FIGURE 2 is a block diagram representing the essential components used to encode control information in accordance with the present invention;

FIGURE 5 is a schematic diagram of a detailed circuit arrangement of a decoding means having two pair of multivibrators, in accordance with the present invention;

FIGURE 6 shows a portion of a detail circuit useful in the integration of an output signal from the gate of the decoding means for circuit control.

Figure 3:
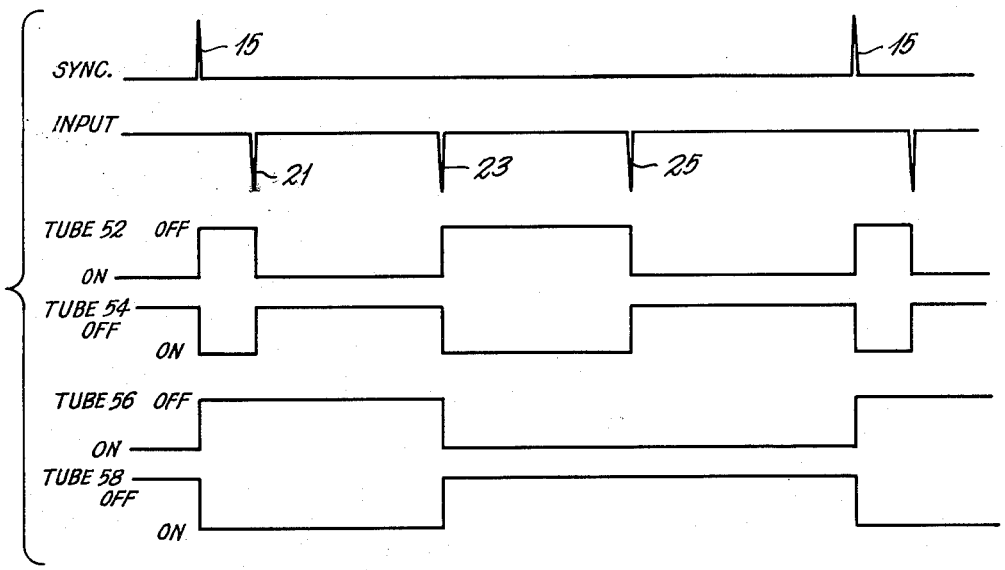
FIGURE 3 shows a waveform diagram of the ON and OFF states of the switches of a decoding means.

Referring now to the figures, there is shown in FIG. 1 surface control equipment 10 for producing a sync impulse or trigger pulse sent down the logging cable 12 to an acoustic well logging tool 14 for the control of transmissions of acoustic energy therefrom, as has been described in copending application of Allen W. Engle, John L. Casey and Adrian P. Brokaw, filed January 16, 1959, having Serial No. 787,292, now Patent 3,112,466, for "Acoustic Well Logging System." The trigger pulse 15, shown in FIGURE 3, more conveniently called a system trigger in that it actuates control functions in a computer 16 and other surface control equipment, as well as circuits in the logging tool, may also be used in an arrangement which is used to encode control information.

The sync impulse or system trigger is coupled into an encoder 20 in the surface control equipment, having a plurality, namely three, of variable-time interval generators 22, 24, 26, which may be connected in a chain network or a ring network. These generators are devices which produce output pulses 21, 23, 25, respectively, when activated by the system trigger 15, FIGURE 3, applied to the generator 22, or when generators 24, 26 receive an output pulse from the generator connected preceding thereto as an input pulse. Each output pulse follows the system trigger or input pulse by a length of time, which may be externally controlled manually by a knob or lever, by an electrical signal, or any other convenient control means (not shown). This type of variable-time interval generator is a circuit action obtainable from various well-known conventional circuits such as a phantastron, univibrator, or a variable-time delay line, and the like.

The first variable-time interval generator 22 is triggered by the sync pulse. After the controllable interval, known as interval No. 1, it produces an output pulse which triggers the second variable time interval generator 24. This same output causes a high energy pulse generator 30, which may be, for example, a triggered blocking oscillator, to produce a pulse 21 with sufficient energy to traverse the length of the logging cable. After a second interval, known hereafter as interval No. 2, the second variable-time interval generator produces an output pulse which triggers the third variable-time interval generator 26 and the high energy pulse generator 30. The output pulse from generator 26, after the controlled interval, known as interval No. 3, triggers only the high energy pulse generator 30. These three pulses 21, 23, 25 from the high energy pulse generator are sent down the logging cable to the decoder unit shown in FIGURE 5.

It is apparent from the schematic diagram of the decoder in FIGURE 5 that the first three electrode elements, i.e., the cathode, the control grid and the screen grid, of each pair of vacuum tubes 52, 54 and 56, 58, form a bistable multivibrator. From the cable connecting the acoustic logging tool and decoder thereof to the earth's surface, there is coupled a sync input over a sync input conductor 60 which in the absence of a sync signal is returned to a D.C. level of zero volts, i.e., ground potential. If a positive pulse or a system trigger be now applied on the sync input conductor 60, then tubes 54 and 58 are rendered conductive, regardless of their previous state or condition, and will cause tubes 52 and 56 to become cutoff, or non-conductive. If we call the conducting state or condition of a given screen grid as ON, and the cutoff state or condition as OFF this condition may be shown graphically as in the waveform diagrams of FIGURE 3. The diagram shows that at the arrival of the sync pulse, tubes 54 and 58 are switched to the ON condition.

The tubes remain in this state until the end of the interval No. 1, at which time pulse 21 generated at the surface by the encoder of FIGURE 2 is sent down the logging cable to the tool and applied on signal input conductor 64 to a transformer 66 and thence to tubes 52, 54. Transformer 66 is connected so that the signal pulse is negative at output of the secondary. This signal pulse causes a reversal of the state of tube 52 which is now rendered to the ON state and tube 54 is now OFF. From the screen grid of tube 54 there is coupled a positive pulse by conductor 68 to tubes 56 and 58. The bistable multivibrator consisting of tubes 56, 58 is substantially insensitive to positive pulses, so that the condition of the multivibrator 56, 58 is not affected by this pulse. This action is explained in detail in Millman and Taub, "Pulse and Digital Circuits," pages 140–173. The tubes 52–58 remain in these states until the end of interval No. 2. At this time a second pulse 23 from the surface equipment encoder, is again applied to the transformer 66 and reverses the state of multivibrator tubes 52, 54. The negative wavefront at the screen of tube 54 is then coupled as a pulse over conductor 68 to multivibrator tubes 56, 58. The mutivibrator 56, 58 is then triggered by this pulse since it is negative in nature. At this time, as is shown at the second signal pulse 23, the result of the pulse is that the screen grids tend to hold tubes 52 and 58 OFF, and tend to hold tubes 54 and 56 ON. They remain in this state until the end of interval No. 3. The third pulse 25 from the surface encoder 20 coupled over the cable to the subsurface tool then reverses the state of tubes 52 and 54, and the positive pulse coupled over conductor 68 does not change the state of tubes 56, 58. The tubes 52–58 remain in this state until the next sync pulse at which time the cycle recommences. All of these changes are graphically shown by the waveform diagram of FIGURE 3, showing the changes as they occur with relation to the sync and signal input pulses.

The tubes used in this decoder unit must be of a type such that the suppressor grid acts as a supplemental control grid and controls the plate current, such as tube types 6ASC6, 6CS6, and 6BN6. It is the nature of such tubes that the plate current may be cut off with either the control or suppressor grid, while only the control grid can cutoff the screen current. Although the screen current is affected by the plate current, and hence by the suppressor voltage if the control grid is positive with respect to the cathode, this effect is minimized in a straight-forward manner by appropriate selection of circuit elements. It is, therefore, possible to construct an arrangement wherein the screen grid current flows if the control grid is positive with respect to the cathode, regardless of the suppressor voltage. In such an instance, the plate current flows only if both control and suppressor grids are positive with respect to the cathode. This arrangement may be used to perform the logical function AND followed by an inverter. That is, the plate current of tube 52 flows only when the screen grid is ON, and when the suppressor is positive with respect to the cathode or ON since the screen grid is ON only when the control grid is positive with respect to the cathode, and likewise on each of the other tubes. The plates are then used as the outputs of gates or gate circuits indicating coincidence of the ON condition at both the control and suppressor grids, and the gate output is labeled 82, 84, 86, 88. The suppressor grid of tube 52 is connected to the control grid of tube 56 through a resistance 90, this resistor preventing pickup on tube 52 from affecting tube 56.

Figure 4:
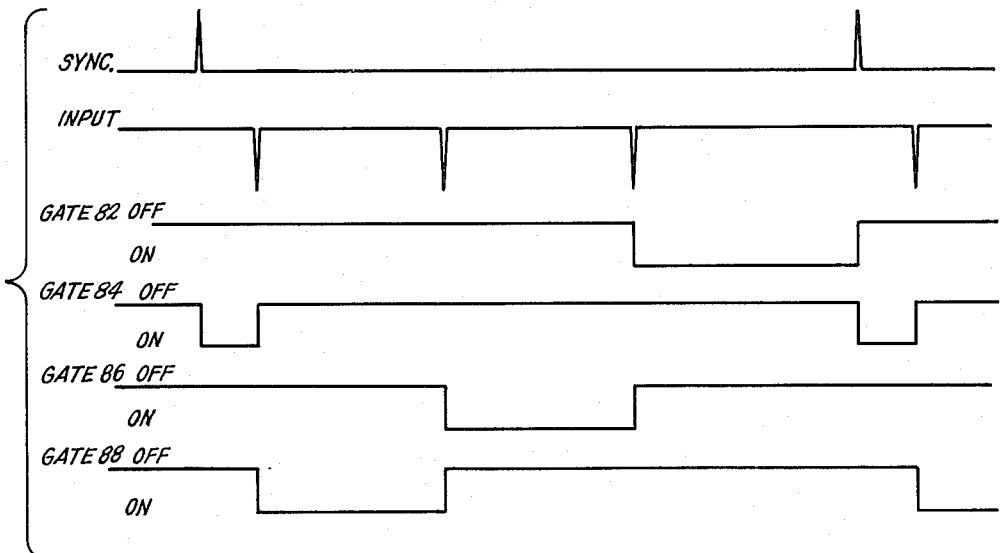
FIGURE 4 shows a waveform diagram of the gating operation of the decoding means in accordance with the present invention.

In a similar manner tube 54 connects to tube 58, through a resistance 92; tube 56 connects to tube 54 through a resistance 94; and tube 58 connects to tube 52 through a resistance 96. Plate current will now flow in tube 52, and gate output 82 will be ON only when the screen grids of tube 52 and tube 56 are both ON. By inspection of waveforms of FIGURES 3 and 4, it is apparent that these conditions are satisfied only during interval No. 4. Waveform diagram shown in FIGURE 4 illustrates this on the gate 82. By similar reasoning, gate 84 is ON only during interval No. 1, gate 86 is ON only during interval No. 3, and gate 88 is ON only during interval No. 2. Since the duration of intervals No. 1, No. 2 and No. 3 are controlled from the surface by the variable-time interval generators of the encoder 20, there are in the subsurface tool, three pulses the duration of each of which may be changed independently of the others. If the time between sync pulses is also variable, interval No. 4 may also be controlled from the surface. These adjustable pulses may then be used to control the parameters of a well logging instrument.

An example of a circuit for controlling a parameter, such as the gain of an amplifier in an acoustic well logging tool, is shown in FIGURE 6. By applying the gate output to an integration circuit, a control signal may be provided to bias an amplifier or amplifiers in the acoustic well logging tool.

An integrating circuit may be connected to any one of the gate outputs 82–88. This integration circuit, comprised of resistance 100 and capacitance 102 and resistance 104, has a time constant much longer than the interval between gate pulses from one cycle to the following cycle. In conjunction with coupling capacitor 106 and the D.C. restorer, diode 108, resistance 100, capacitor 102 and resistance 104 integrate the gate pulses to form a voltage at the integration output 110 which varies as the duration of the gate pulses applied thereto. This voltage may be used to control the gain of a variable mu tube, or operate any such voltage sensitive device. Additional integrators 98 may be coupled to the other gate outputs to provide other voltage controlled outputs. The pulses from the gate output may be also used for other convenient purposes such as turning ON and OFF various devices at appropriate times of a cycle, controlling commutation devices in a time sharing system, and other related objectives.

Figure 7:
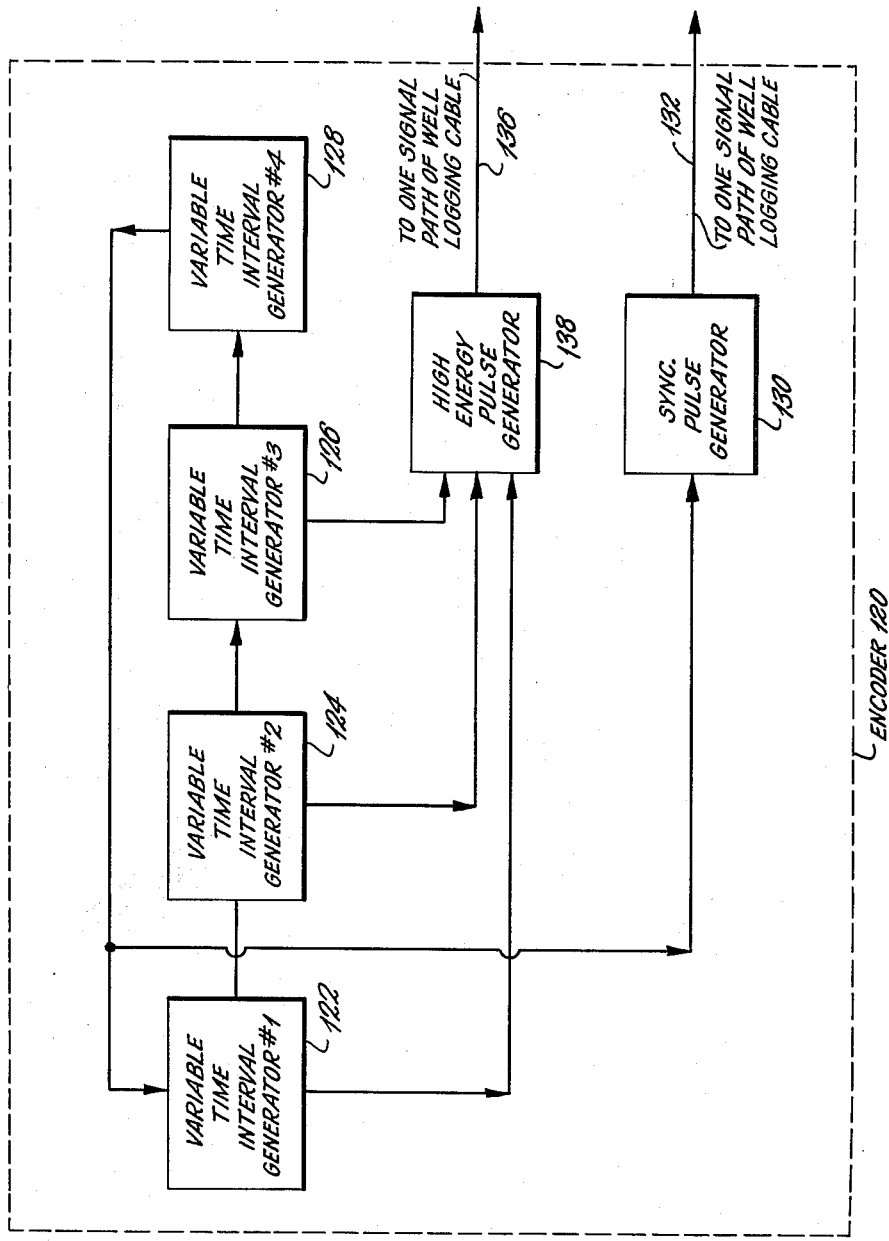
FIGURE 7 is a block diagram representing a modification of the essential components of the encoder.

In a system which does not already use a sync signal, an encoder 120 shown in FIGURE 7 may be used to provide a sync pulse. In addition to variable-time interval generators 122, 124 and 126 similar to the circuit and operation of FIGURE 2, there is a fourth variable-time interval generator 128 used to provide an interval No. 4. A sync pulse generator 130 in response to the output of the fourth variable-time-interval generator 128, produces a sync pulse which is sent down the cable to the logging tool over conductor 132; this yields a reference of time to the subsurface tool so that it may determine which interval is being sent down the other cable 136 from high energy pulse generator 138. This sync signal may be sent down a second signal path as via conductor 132, or instead it may be sent down the original path as via conductor 136 if the sync pulses are of polarity opposite to those from high energy pulse generator 138. In the alternative system, the sync pulses of opposite polarity may be applied to conductor 136 by connecting the output of sync pulse generator to the conductor 136. The sync pulses may be picked off by another tarnsformer-diode combination similar to 66 and 67, in which the diode eliminates pulses of unwanted polarity and applies the signal to the sync input.

In the event that the high energy pulse generator 138 is capable of providing output pulses to conductor 136 of either polarity, then the sync pulse generator 130 may be omitted and a connection made from the fourth variable-time interval generator 128 to the high energy pulse generator 138 to produce these sync pulses of opposite polarity from the signal pulses of the variable-time interval generators 122, 124, 126.

If the control pulse generating means of FIGURE 7 and the interconnections to the logging tool are highly reliable, the synchronizing by a sync pulse generator 130, or the like, need be done only once at the beginning of a logging operation, and the sync pulse may then be replaced by a fourth control pulse.

The remote control system is found to be stable and tends to stay in synchronization, however, the loss of one or more control pulses from the encoder of FIGURE 2 or FIGURE 7 will change the interval during which any given gate is ON, so that the sync pulses will usually need to be applied continuously to assure that the decoder is following the instructions of the encoder.

This same basic system may be applied to a greater or lesser number of variables, which would provide for proportionately greater or lesser number of variable-time interval generators in the encoder and a corresponding greater or lesser number of multivibrators in the decoder. In the case where one or two variables are to be controlled, the gate may be eliminated since the outputs of the multivibrator may be used directly. Where three variables are to be controlled, however, one of the gates may be eliminated and the pentode replaced by a triode having characteristics similar to the first three elements of the pentodes. If more than four variables are to be controlled, the number of gates required may be greater than the number of tubes required in the multivibrators. As an example, eight variables may be controlled by three multivibrators, since among the three, there are eight stable states. Three multivibrators require six tubes, unless they are for very high speed operation or other particular or special cases, however, eight gates will be required. It thus becomes necessary to provide at least two additional conventional gate circuits which may be of any convenient configuration. It is possible to obtain more than six outputs without extra gates other than those in the multivibrator tubes, if tubes having more than five electrodes are used.

Since the four tube arrangement is very economical with a reduced number of signal paths connecting the encoder and the decoder and with a minimum amount of auxiliary equipment, it is convenient to use such arrangement to control the gain of three amplifying channels in a multiple spaced acoustic well logging instrument. The basic ideas of its operation, however, are readily applied to other types of remote control systems. The system may, of course, be used in an alternative manner, wherein the time interval generators are controlled by variables at a remote location, and the gate pulses are used as an indication of these variables.

Preferred embodiments of the invention have been described. Various changes and modifications, however, may be made within the scope of the invention as set forth in the appended claims.

What is claimed is:

1. A remote control apparatus for well logging systems comprising surface means for producing a repetitive series of pulses, one pulse of said series being a characteristic synchronizing pulse; means for varying the interval between respective successive pulses in accordance with control information; and subsurface means comprising a plurality of bistable multivibrators responsive to said pulses by changing state on receipt of each of said pulses and responsive to each of said synchronizing pulses to attain an unique state regardless of its state prior thereto, means interconnecting said multivibrators to derive a control signal related in duration to the state of said multivibrators, and means utilizing said control signal to control a parameter of a well logging instrument.

2. In a well logging system including a subsurface logging tool, surface control and recording equipment, and a logging cable connected between said tool and said surface equipment, the improvement comprising
    an encoder connected to said cable and having time interval generators connected in a ring network to produce a synchronization pulse,
    pulse energy producing means connected to said generators and said cable for applying control pulses to said tool in response to said generators,
    a decoder in said tool comprising a pair of bistable multivibrators connected to receive said synchronization pulses and said control pulses,
    said multivibrators each comprised of a pair of switch devices,
    said multivibrators each being responsive to each of said synchronization pulses by assuming a pre-determined condition.

References Cited by the Examiner
UNITED STATES PATENTS

| | | | |
|---|---|---|---|
| 2,647,996 | 8/53 | Greenfield | 328—119 |
| 2,717,370 | 9/55 | Piper | 340—206 |
| 2,737,639 | 3/56 | Sommers | 340—18 |
| 2,825,044 | 2/58 | Peterson | 340—17 |
| 2,894,127 | 7/59 | Stillwell | 328—119 |

OTHER REFERENCES

Sarbacher: Dictionary of Electronics and Nuclear Engineering, Prentice-Hall, Inc., Englewood Cliffs, N.J., 1959, page 806.

SAMUEL FEINBERG, *Primary Examiner.*

EVERETT R. REYNOLDS, CHESTER L. JUSTUS, *Examiners.*